(12) United States Patent
Yoshida

(10) Patent No.: US 8,506,166 B2
(45) Date of Patent: Aug. 13, 2013

(54) LINEAR MOTION GUIDE UNIT

(75) Inventor: Yoshihiro Yoshida, Gifu-ken (JP)

(73) Assignee: Nippon Thompson Co. Ltd., Tokyo (JP)

( * ) Notice: Subject to any disclaimer, the term of this patent is extended or adjusted under 35 U.S.C. 154(b) by 282 days.

(21) Appl. No.: 12/978,998

(22) Filed: Dec. 27, 2010

(65) Prior Publication Data

US 2011/0176754 A1 Jul. 21, 2011

(30) Foreign Application Priority Data

Jan. 20, 2010 (JP) ................................. 2010-010123

(51) Int. Cl.
*F16C 29/06* (2006.01)

(52) U.S. Cl.
USPC .................................. 384/15; 384/13; 384/44

(58) Field of Classification Search
USPC .................. 384/13, 15, 43–45, 49, 50; 184/5
IPC ........................................................ F16C 29/06
See application file for complete search history.

(56) References Cited

U.S. PATENT DOCUMENTS

| | | | | |
|---|---|---|---|---|
| 5,380,097 | A | * | 1/1995 | Tanaka ............................ 384/13 |
| 2006/0045394 | A1 | * | 3/2006 | Matsumoto ..................... 384/44 |
| 2006/0231335 | A1 | * | 10/2006 | Lin et al. .......................... 184/5 |
| 2007/0053619 | A1 | * | 3/2007 | Kuwabara ....................... 384/13 |
| 2007/0071372 | A1 | * | 3/2007 | Kuwabara et al. .............. 384/44 |
| 2008/0080795 | A1 | * | 4/2008 | Kuwabara et al. .............. 384/13 |
| 2008/0260307 | A1 | * | 10/2008 | Geka et al. ...................... 384/50 |
| 2008/0279489 | A1 | * | 11/2008 | Kondo ............................ 384/15 |
| 2008/0285899 | A1 | * | 11/2008 | Fumoto et al. ................. 384/13 |
| 2008/0292226 | A1 | * | 11/2008 | Chen et al. ...................... 384/15 |
| 2009/0016654 | A1 | * | 1/2009 | Kakei ............................. 384/44 |

FOREIGN PATENT DOCUMENTS

| | | |
|---|---|---|
| JP | 10-78032 A | 3/1998 |
| JP | 2008-82433 A | 4/2008 |

* cited by examiner

*Primary Examiner* — James Pilkington
*Assistant Examiner* — William Santosa
(74) *Attorney, Agent, or Firm* — Browdy and Neimark, PLLC

(57) ABSTRACT

Lubrication for rolling elements are made in a turnaround passage in an end cap to ensure proper and steady lubrication by the lubrication system simple in construction, with accompanying sustainable maintenance-free condition for lubrication. The end cap has an inward end surface facing directly towards the end surface of the carriage of the slider and having a concavity which sinks below the inward end surface and has openings communicating with the turnaround passages. A porous compact impregnated with lubricant is fitted into the concavity in a fashion exposed in part to the turnaround passage through the openings so that the rolling elements rolling through the turnaround passages, as coming into rolling-contact with the parts of the porous compact exposed out of the openings, are applied with the lubricant.

9 Claims, 9 Drawing Sheets

FIG.3
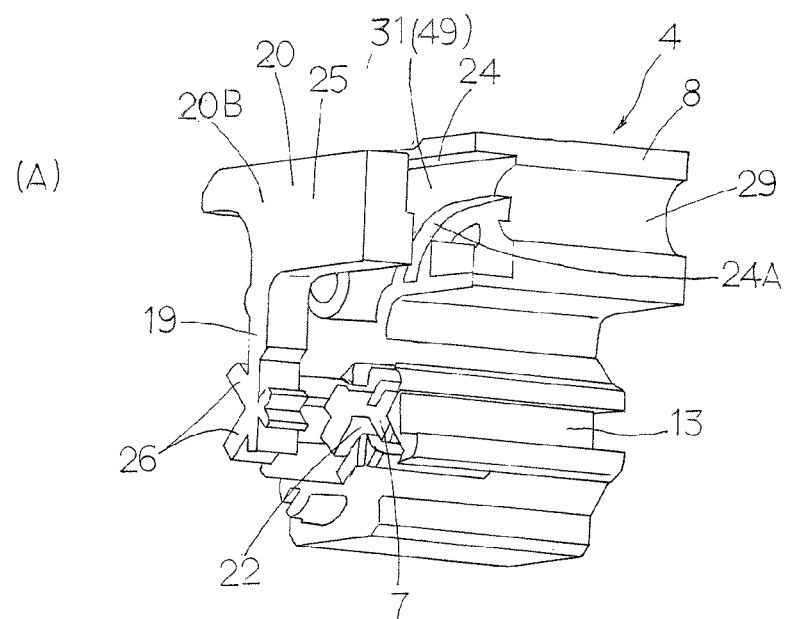
(A)
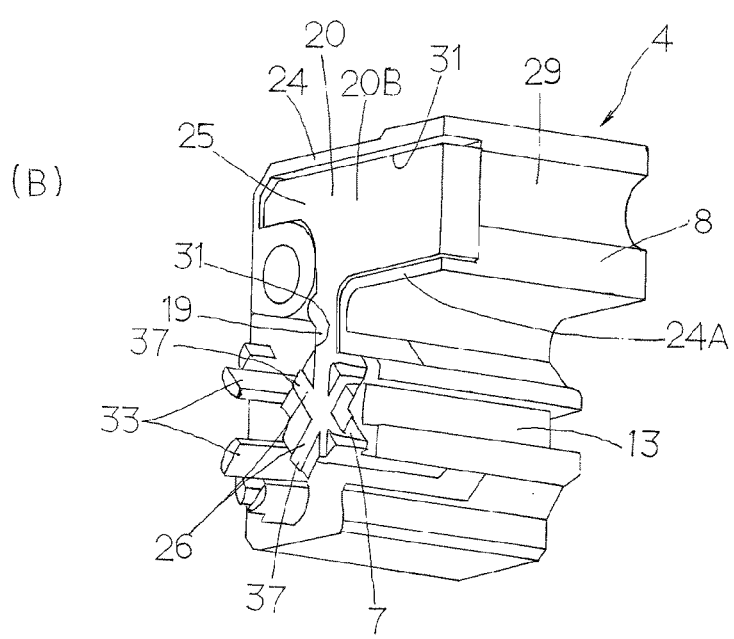
(B)

FIG. 7
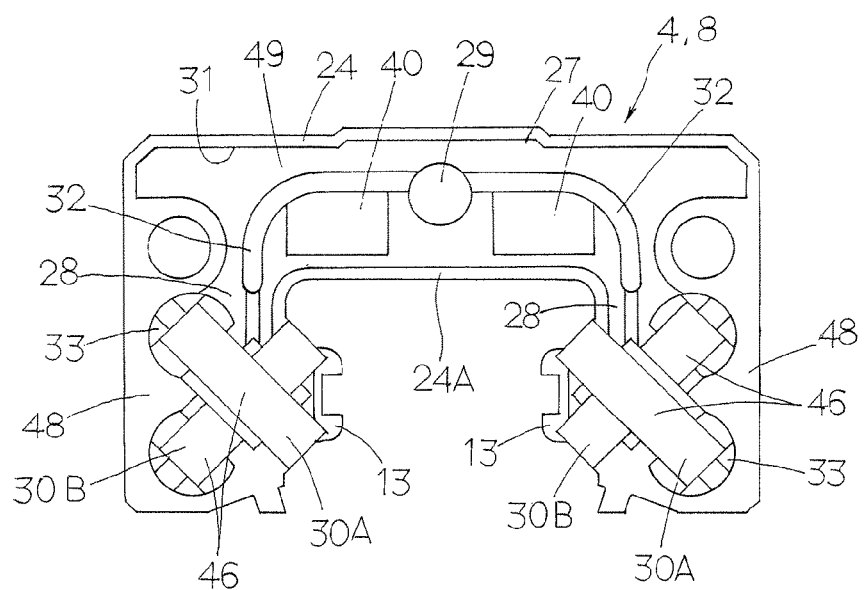
FIG. 8
(A)
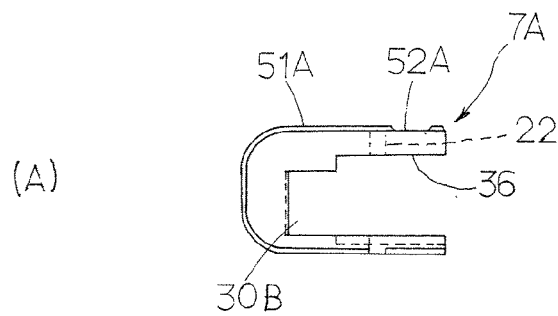
(B)
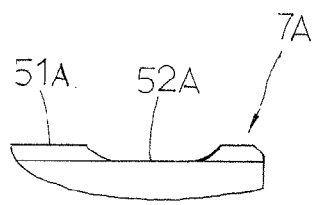

FIG. 11
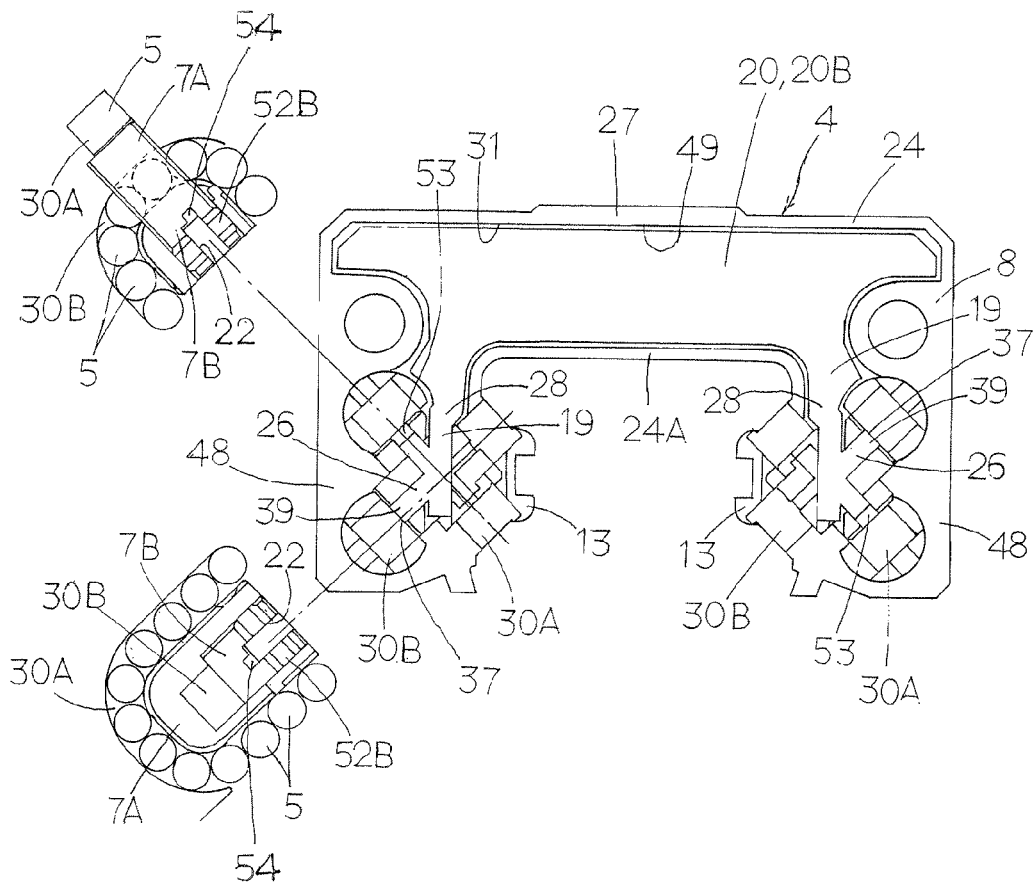
FIG. 12 (A) (B)
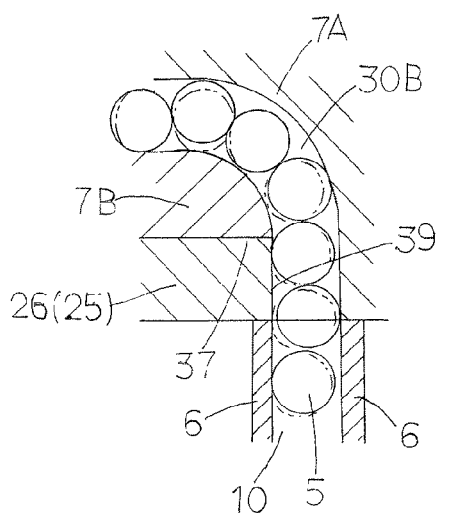
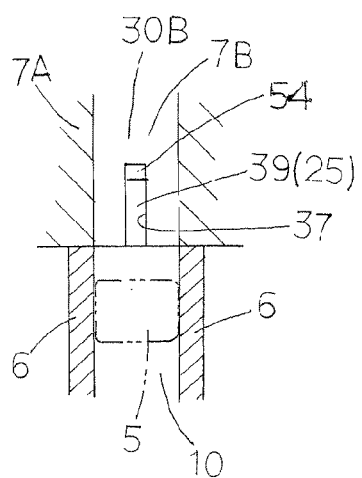

LINEAR MOTION GUIDE UNIT

FIELD OF THE INVENTION

The present invention relates to a linear motion guide unit comprised of an elongated guide rail and a slider designed to move on the elongated guide rail relatively to the guide rail by virtue of more than one rolling element of cylindrical roller, and in which lubrication for the roller is done inside a turnaround passage lying in an end cap of the slider.

BACKGROUND OF THE INVENTION

Linear motion guide units have been extensively applied in recent years between relatively sliding parts for linear reciprocating mechanism used in increased industrial fields including semiconductor fabricating equipment, machine tools, industrial robots, and so on. Most prior linear motion guide units have been ordinarily fed with lubricant every a preselected interval through any oiling port to ensure smooth lubrication for the rolling elements throughout a circulating circuit. Recently advanced machines and instruments, nevertheless, are increasingly needed to make them virtually maintenance-free from many aspects of conserving energy as well as keeping running cost and maintenance cost of equipment reasonably less than ever. Correspondingly, the linear motion guide units incorporated in the advanced machinery, especially the linear motion guide units of the sort of roller bearings are also challenged to keep down the consumption of lubricant to a minimum, along with realizing virtual maintenance-free operation where lubricant resupply is less needed over long-lasting operation. With the linear motion guide units constructed as stated earlier, continuous application of lubricant on or between the load-carrying race and the rolling element is indispensable to continue maintaining an adequate lubricant film around the rolling elements to keep them against metal-to-metal contact that might otherwise occur, thereby making sure of their high durability.

In Japanese Laid-Open Patent Application No. 2008-82, 433 which is a commonly-assigned senior application, there is disclosed an example of the sliding system in which application of lubricant around the rolling elements was done at the turnaround passage to make the lubrication system simpler than ever in construction, along with maintenance-free for steady and positive oil lubrication. With the prior sliding system constructed as stated earlier, a porous compact impregnated with lubricant fits into a concavity made on an outward end surface of the end cap, which is in the face of the associated end seal. The concavity is deep pitted to open into the turnaround passage in the end cap. The porous compact impregnated with lubricant is placed in the concavity in the end cap in such a way as to expose in part itself to the turnaround passage through the deep pit. Thus, the porous compact makes contact with the rolling elements running through the turnaround passage to come to supply with the lubricant around the rolling elements.

Conventionally, the linear motion guide unit lubricated with oil impregnated in polymer member is known in the art and disclosed, for example in Japanese Laid-Open Patent Application No. H10-78 032. With the prior linear motion guide unit, an end cap is made therein with a curved passage to form a part of a circulatory passage which allows the rolling elements to run through there. A radially inward curved surface defining the curved passage is partially constituted with a return guide that is made of lubricant-containing polymer lined with a reinforcing member. The return guide fits into a groove semicircular in transverse section cut into the back of the end cap. The return guide conforming to the radially inward curved surface of the turnaround passage is made of potassium titanate whisker-reinforced polymer composites containing lubricant therein, which is integrally cast in the mold. With the return guide constructed as stated earlier, the reinforcing member accounts for a major percentage in content to increase the mechanical strength of the return guide and, correspondingly, the polymer to contain lubricant therein to be oozed for lubrication gets less in content, causing shortage of lubricant contained. Moreover, the polymer after the lubricant has oozed away comes to shrinkage or contraction to thwart the flow of lubricant inside the polymer. This would cause a shortage of worse supply of lubricant around the rolling elements.

Meanwhile, with the miniaturized linear motion guide unit in which tiny rollers are built as a four-row array around the guide rail having a width of for example 12 mm, our experts have ever tried doing the lubrication for the rollers inside the turnaround passage in the end cap using the same construction as disclosed in the commonly-assigned Japanese Laid-Open Patent Application No. 2008-82 433 recited earlier, in which the porous compact lying on the outward end surface of the end cap in the face of the associated end seal has a lubricant reservoir whose a part protrudes to be exposed in the turnaround passage through the opening pitted in the end cap. On the other side, the linear motion guide unit constructed as stated earlier normally has a binding strip to fasten a retainer plate to the slider, which is to keep the rolling elements against falling away from a load-carrying race, and for the sake of which the end cap on its outward end surface facing the end seal has grooves into which the bent ends of the binding strip fit to make snap-engagement with the associated end cap. Because the grooves to retain the binding strip take up a large space across the outward end surface of the end cap, it is impractical to make the porous compact large in volume at either side of the lubricant reservoir and the protrusion coming into contact with the rolling elements. It was found that making the porous compact excessively large in volume would render overall the linear motion guide unit worse or less in mechanical strength. Moreover, the protrusion of the porous compact, as undergoing repeated collisions with the rolling elements, is needed to have a mechanical strength enough to stand up to repeated impacts caused by the rolling elements.

Meanwhile, there are two members of the class of linear motion guide units, one of which has balls and the other has cylindrical rollers. With the linear motion guide unit in which cylindrical rollers or needles are selected as the rolling elements, alignment problems to guide rollers in good rolling order without getting leaned or tilted in rolling posture are more encountered, compared with the construction using balls as rolling elements. To cope with this, the cylindrical rollers have to be guided not only on their circular rolling surfaces, but also on their axially opposite end surfaces. Conventionally, there has been no linear motion guide unit constructed to meet with an aspect of allowing the rollers to roll through the circulating circuit over a long-lasting service life with adequate application of lubricant, making certain of steady reliability of the maintenance-free on lubricant application. Advanced technology has come to hope a linear motion guide unit which, even though simplified construction, is capable of retaining ample lubricant enough to conduct steady and sustainable lubrication for rollers, ensuring the smooth circulating motion of the rollers over a long-lasting period.

SUMMARY OF THE INVENTION

The present invention has for its primary object to overcome the major challenges as stated earlier, and to provide a linear motion guide unit adapted to be used in a reciprocating mechanism built in semiconductor fabricating equipment, machine tools, industrial robots, and so on. The linear motion guide unit employs rollers as rolling element and further uses a binding strip to fasten for example a retainer plate to keep the rollers against falling away from a slider. More particularly, the present invention is envisaged coping with lack of space for a lubrication system chiefly because grooves to fit over the binding strip is cut into an outward end surface of an end cap, which is in the face of the associated end seal. To this end, the present invention provides a linear motion guide unit in which an end cap has a concavity on an inward end surface thereof which faces directly towards a carriage of the slider, and a cellular or porous compact impregnated with lubricant fits into the concavity, the end cap being constituted with an end cap major body and a spacer part to be nested inside the end cap major body, and the spacer part having a hole open to a turnaround passage. With the linear motion guide unit constructed according to the present invention, application of lubricant on the rollers can be done by only a simplified lubrication system. Moreover, the porous compact, as adapted to conform to the deep concavity in the end cap, is allowed to have a lubricant reservoir capable of retaining lubricant therein as large in volume as possible. Even if the end cap is small in construction, the porous compact itself can have the lubricant reservoir which is impregnated with ample lubricant enough to conduct steady and sustainable application of lubricant around the rollers with accompanying maintenance-free lubrication over a long-lasting period.

The present invention is concerned with a linear motion guide unit; comprising an elongated guide rail having a pair of first raceway surfaces extending lengthwise of the guide rail, and a slider movable lengthwise of the elongated guide rail in a sliding manner; wherein the slider has a carriage, end caps, end seals, and more than one rolling element, wherein the slider has a carriage, end caps, end seals, and more than one roller selected as the rolling element, the carriage having a pair of second raceway surfaces extending in opposition to the first raceway surfaces on the guide rail to provide a pair of load-carrying races between the first and second raceway surfaces, and a pair of return passages extending along the paired load-carrying races, the end caps being fastened on forward and aft end surfaces of the carriage, one to each end surface, and provided therein with turnaround passages to join together the load-carrying races and the return passages, the end seals being attached on outward end surfaces of the end caps, and the rollers which are allowed to roll through a circulating circuit made up of the load-carrying races, return passages and a pair of the turnaround passages; and wherein the end caps each have an inward end surface facing directly towards an end surface of the carriage and having a concavity which sinks below the inward end surface and has a pair of openings communicating with the paired turnaround passages, and a porous compact impregnated with lubricant and fitted into the concavity in a fashion exposed in part to the turnaround passages through the openings so that the rolling element rolling through the turnaround passages, as coming into rolling-contact with at least one of the parts of the porous compact exposed out of the openings, are applied with the lubricant.

In one aspect of the present invention, there is disclosed a linear motion guide unit in which the end cap is composed of a pair of spacer parts to form a circular curved surface, that is, one spacer part for an inside curved half, the other for an outside curved half-defining the turnaround passage and an end cap major body to form an outside curved surface of the turnaround passage, the spacer parts each having the opening and a slot which fits over a part of the porous compact and terminates in the opening, and wherein the paired spacer parts are made up of a first spacer part fitted into the end cap major body and a second spacer part nested in to the first spacer part.

In another aspect of the present invention, there is disclosed a linear motion guide unit in which the paired spacer parts are each constituted with a curved zone to get the rolling elements turning round in running direction and straight zones integral with opposite ends of the curved zone and merged into the return passages, and wherein the opening to expose the porous compact in part to the turnaround passage is on a side surface of the straight zones.

In the present invention, there is disclosed a linear motion guide unit in which the concavity inside the end cap major body has a basin spreading over an upper area of the end cap major body, a pair of deep pits merging with the basin and extending in the sliding direction, a pair of channels starting from the basin to reach the slots cut in the spacer parts, a lubrication port lying in the upper area of the end cap major body, and oiling paths extending along a bottom over the basin and the channels to reach the lubrication port.

In the present invention, there is disclosed a linear motion guide unit in which the porous compact has a first reservoir portions extending in the sliding direction into the deep pits of the concavity to reserve the lubricant therein, a second reservoir portion conforming to the flat basin to reserve the lubricant therein, a pair of slim downward extensions to fit into the channels, and paired applicator noses formed integral with the extensions to fit into the slots in the paired spacer parts to lead the lubricant out of the openings in the spacer parts, applying the lubricant around the rolling elements.

In the present invention, there is disclosed a linear motion guide unit in which the rolling elements, while rolling through the turnaround passages, come into rolling-contact with exposed tips of the applicator noses of the porous compact to be coated with the lubricant.

In the present invention, there is disclosed a linear motion guide unit in which the porous compact after having fitted into the concavity in the end cap major body forms a route to make up for scarcity of lubricant.

In the present invention, there is disclosed a linear motion guide unit in which the first and second spacer parts have dents on outside surfaces of the straight zones, the dents each being defined with a flat middle and curved opposite edges with respect to the traveling direction of the rollers to provide a lubricant sump.

In the present invention, there is disclosed a linear motion guide unit in which the exposed tip of the applicator nose in the porous compact has a length ranging from 1.0 to 1.5 times a diameter of the roller selected as the rolling element, and a width ranging from 30 to 50% of an axial distance of the roller.

In the present invention, there is disclosed a linear motion guide unit in which the porous compact is made of a sintered resinous member of finely powdery ultrahigh molecular weight synthetic resin of any one of polyethylene and polypropylene which is compacted under pressure together with the application of heat, the resulting sintered resinous member having open-porous texture in which pores are open to each other through interstices among resinous particles inside the sintered member, and wherein the lubricant fills in the pores.

In the present invention, there is disclosed a linear motion guide unit suited for the construction in which the end cap major body has an outward end surface facing directly to an end seal, the outward end surface having notches thereon to fit over bent ends of a binding strip which fastens a retainer plate to the slider, the retainer plate being installed to keep in place the rollers during their rolling throughout the load-carrying races and further keep the rollers against falling away from the slider after the slider has taken away from the guide rail.

The linear motion guide unit constructed as stated earlier according to the present invention is best suited, where the installation of the porous compact on the outward end surface of the end cap facing towards the end seal is impracticable, due to the lack of space for the porous compact, as in the end cap on whose outward end surface there is cut notches or grooves to catch the ends of the binding strips. The porous compact impregnated with lubricant is fitted into the concavity which is made on the inward end surface of the end cap facing directly towards the end surface of the carriage. The porous compact is designed to get exposed in part to the turnaround passages through the openings in the spacer parts assembled into the end caps. The rolling elements rolling through the turnaround passages, as coming into rolling-contact with at least one of the exposed parts of the porous compact, are applied with the lubricant. Thus, the lubrication system designed as stated earlier, even though simple in construction and easy in assemblage, is suited to conduct steady and sustainable application of lubricant around the rollers with accompanying maintenance-free lubrication over a long-lasting period.

With the linear motion guide unit of the present invention, moreover, there is no need of the porous compacts on both the forward and aft end caps. Instead, only the porous compact on any one of the forward and aft end caps is sufficient to apply the lubricant to all the load-carrying races in four-line array. This alternative is effective in cost savings and, upon replenishment of lubricant, is sufficient at only any one of the end caps rather than at both the forward and aft end caps.

In contrast, when the linear motion guide unit is required working under severe conditions as in high-tact performance, the porous compact impregnated with lubricant may be used in both the forward and aft end caps to increase the amount of lubricant applied around the rollers, thereby avoiding seizure or seize-up of the rolling elements due to oil starvation. Moreover, the porous compact after having fitted into the concavity in the end cap major body covers the oiling paths to seal oiling routes, keeping the lubricant against leakage. The lubricant flows through the oiling paths into the circulating circuits with seeping in the porous compact and, therefore, the porous compact can be easily replenished with the lubricant.

With the linear motion guide unit of the present invention, the porous compact has the major reservoir which is placed in the upper area out of the turnaround passages in the end caps to make sure of the volume as large as possible. A plenty of lubricant preserved in the major reservoir is led to the tips exposed to the turnaround passages, where the rolling elements come into rolling-contact with the tips and coated with the lubricant. Despite very simple construction, the lubrication system recited earlier helps steady and positive application of the lubricant around the rolling elements with steady with maintenance-free operation for lubrication over a prolonged service life.

BRIEF DESCRIPTION OF THE DRAWINGS

FIG. 3 is a fragmentary view in perspective showing a relative geometry between the porous compact and the end cap; in FIG. 3(A) the porous compact is shown just before it would be fitted in a concavity in the end cap, and in FIG. 3(B) the porous compact is illustrated after it has been snugly fitted in the concavity in the end cap.

FIG. 7 is a view in front elevation showing an end cap major body to be assembled into the end cap of FIG. 6, the view illustrating an inward end surface of the end cap major body which would face directly towards the carriage of the slide.

FIG. 8 is a view in different elevations showing a first spacer part to be fitted into the end cap major body of FIG. 6; FIG. 8(A) is a view in front elevation while FIG. 8(B) is a view in side elevation.

FIG. 9(A) is a view in front elevation while FIG. 9(B) is a view in side elevation.

FIG. 10(A) is a view in front elevation and FIG. 10(B) is a view in side elevation.

FIG. 11 illustrates another version of the linear motion guide unit according to the present invention; the view in plan shows the end cap into whose concavity another version of the porous compact has fitted.

FIG. 12 is a view explaining how lubricant is applied around rolling elements running through the turnaround passage; FIG. 12(A) is pictured in side elevation with respect to a traveling direction of the rolling elements and FIG. 12 (B) is shown in plan with respect to the traveling direction of the rolling elements.

DETAILED DESCRIPTION OF THE PREFERRED EMBODIMENTS

Figure 1:
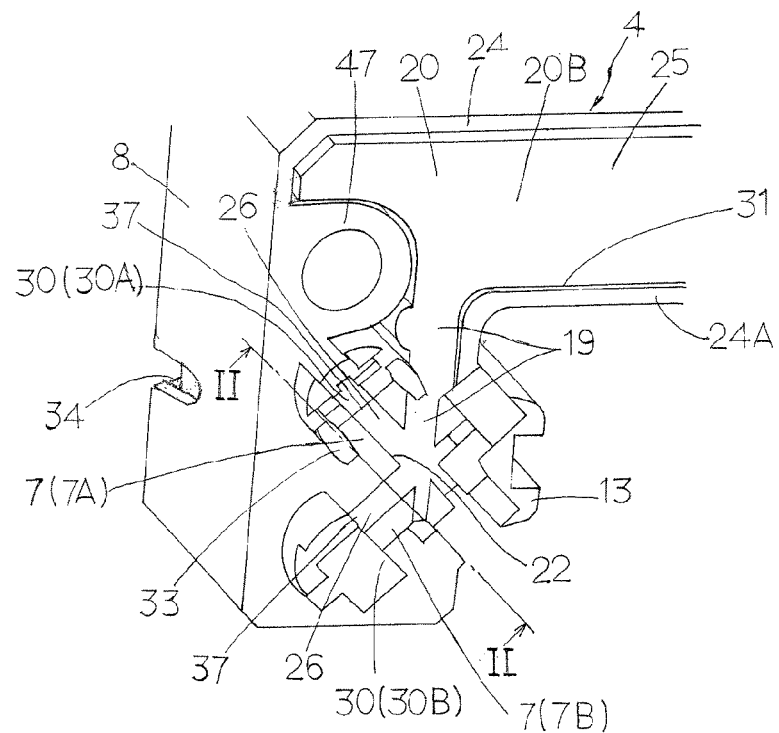
FIG. 1 is a fragmentary view in perspective showing a preferred embodiment of a linear motion guide unit according to the present invention, illustrating in detail the left-side essential portion of an end cap together with a porous compact serving as a lubricant-supply component fitted in the end cap.
Figure 2:
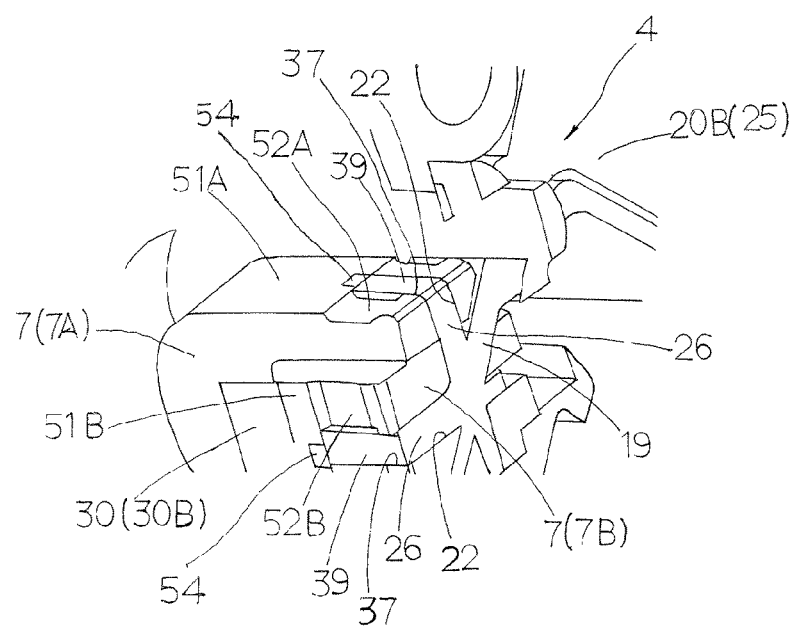
FIG. 2 is an enlarged fragmentary view in perspective to illustrate the porous compact fitted into a spacer part assembled in the end cap, the view being shown split along a plane II-II of FIG. 1 to show a bare or exposed surface of the porous component at a slotted end of the spacer part to come into contact with rollers.
Figure 4:
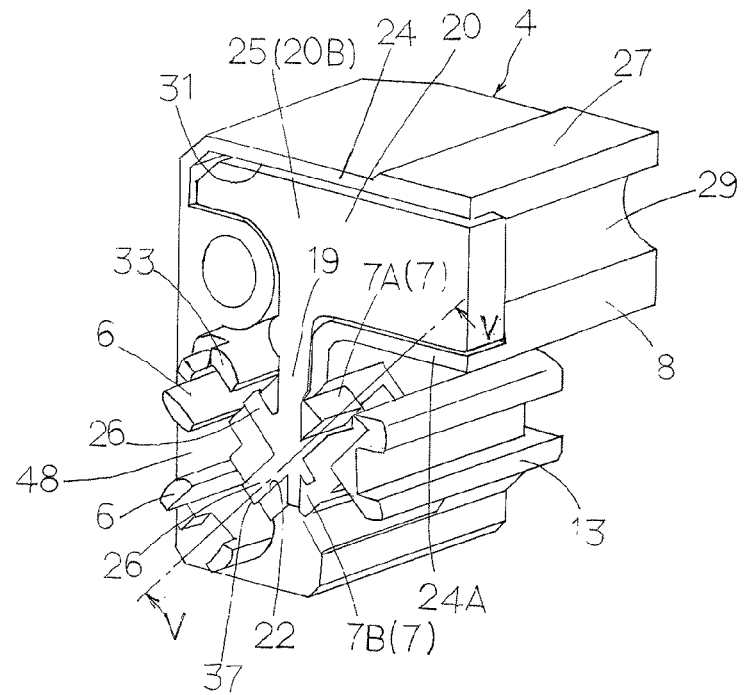
FIG. 4 is a fragmentary view in perspective showing the left-side portion of the end cap together with the porous compact is fitted in the concavity in the end cap.
Figure 5:
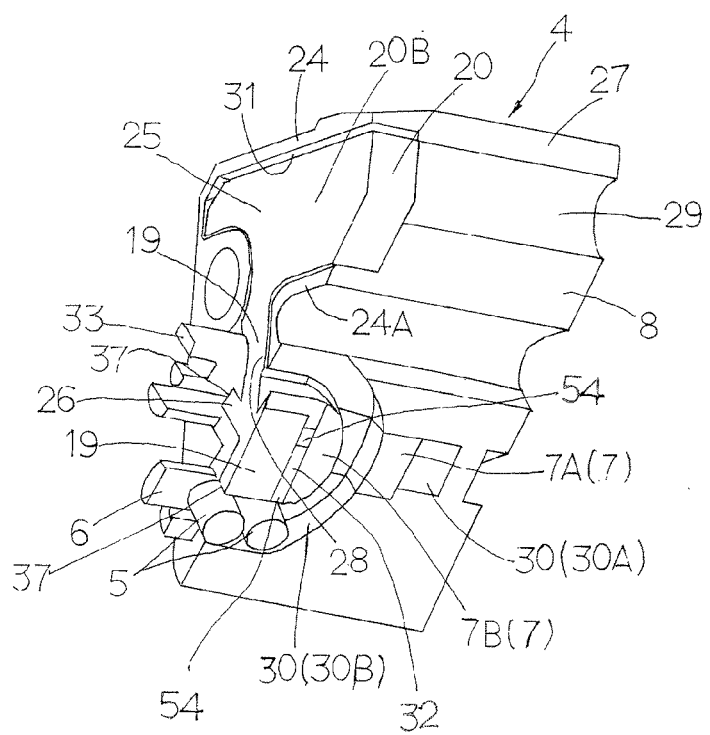
FIG. 5 is a fragmentary illustration in perspective, the illustration being taken on the plane of the line V-V of FIG. 4.
Figure 6:
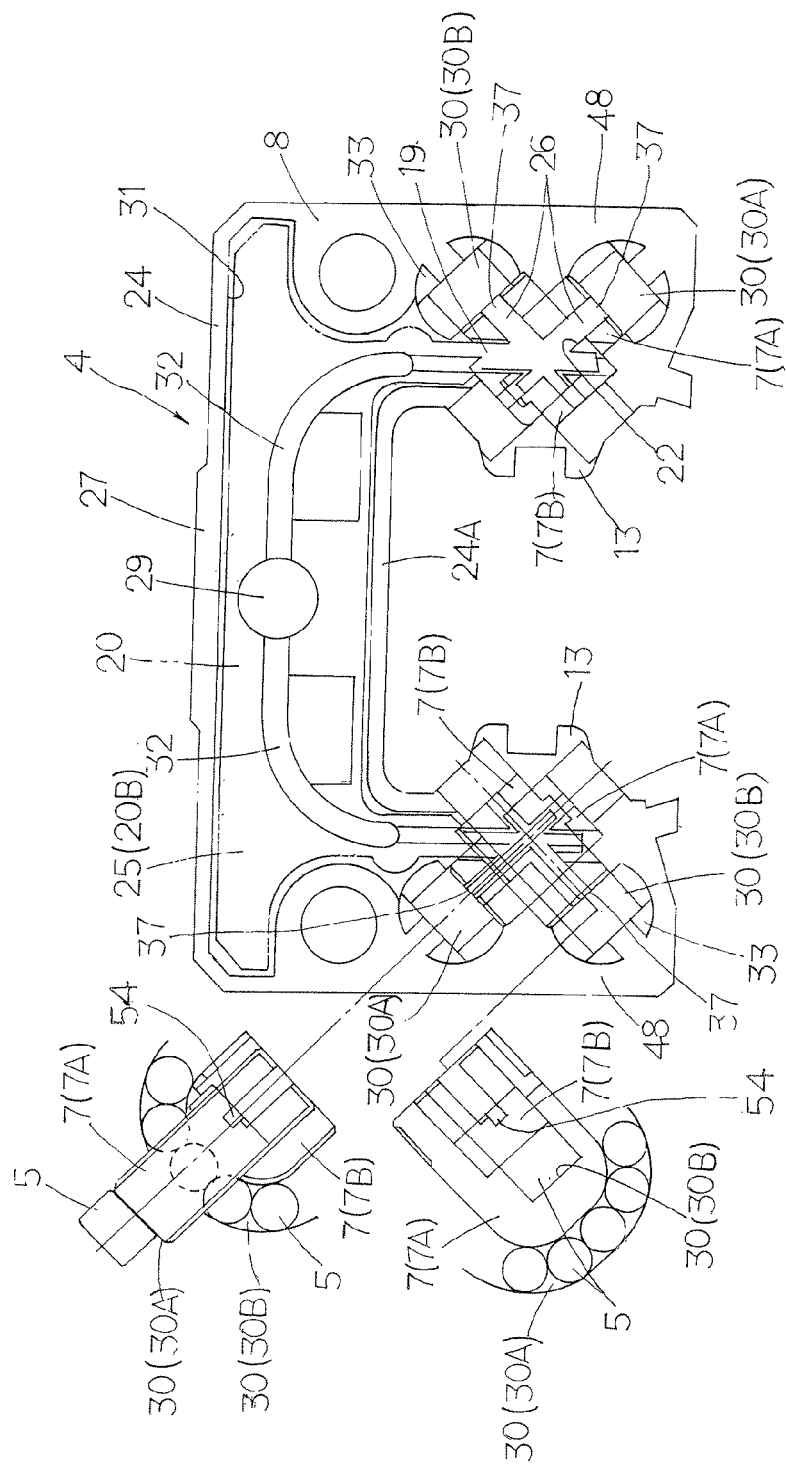
FIG. 6 is a view in front elevation showing an inward end surface of the end cap, which would face directly towards a carriage of a slider in a preferred embodiment of the linear motion guide unit according to the present invention. Depicted at left are views explanatory of turnaround passages.

The linear motion guide unit according to the present invention is envisaged accomplishing substantial maintenance-free operation using chiefly a cellular or porous compact impregnated with lubricant, which is laid on a turnaround passage inside an end cap to conduct positive and steady application of lubricant around rollers as rolling elements over a prolonged period of service life. The linear motion guide unit of the present invention is adapted for use in any relatively sliding components in machinery as diverse as machine tools, various assembling machines, conveyers, robotic machines, semiconductor fabricating equipment, precision machines, measurement/inspection instruments, medical instruments, micromachines, and so on. Especially, the present invention is intended to develop the linear motion guide unit, which can cope with demand to keep better lubrication to the rolling elements over long-lasting service life, thereby making sure of smooth movement of the roiling elements throughout the circulating circuit with accompanying maintenance-free condition for lubrication.

A preferred embodiment of the linear motion guide unit constructed according to the present invention will be described in detail by reference to the drawings. First, referring to FIGS. 13 to 16, there are generally shown the linear motion guide unit, which is mainly comprised of an elongated guide rail 1 having widthwise opposing sides 42 on which paired raceway surfaces (first raceway surfaces) 11 are made to extend lengthwise of the guide rail 1, one pair to each side, and a slider 2 having sidewise opposite bulges 41 that fit over or conform to the guide rail 1 to move or travel in a sliding manner lengthwise of the guide rail 1 by virtue of more than one rolling element of roller 5. The roller 5 is allowed to roll through a circulating circuit 45 that is made up of a load-carrying race 38 defined between the guide rail 1 and the slider 2, a return passage 10 extending lengthwise in the slider 2 in parallel with the load-carrying race 38, and turnaround passages 30 connecting the load-carrying race 38 with the return passage 10.

The slider 2 is chiefly composed of a carriage 3 having sidewise bulges 50 extending beyond the width of the guide rail 1, the bulges 50 being each provided thereon with paired raceway surfaces (second raceway surfaces) 12 lying in opposition to the raceway surfaces 11 on the guide rail 1 and further provided therein with the return passages 10 extending in parallel with the raceway surfaces 12. The slider 2 has end caps 4 each of which has therein the turnaround passages 30 (30A, 30B) to interconnect any one of upside and downside load-carrying races 38 defined between the raceway surfaces 11 and 12 to any associated one of upside and downside return passages 10 after the end caps 4 have been fastened to the carriage 3, using threaded bolts 44 tightened into threaded holes 21 on lengthwise opposite end surfaces 35 of the carriage 3. The slider has end seals 15 secured to outward surfaces 47 of the forward and aft end caps 4 with respect to the traveling direction and further provided with lips 16 to close clearances between the guide rail 1 and the slider 2, and more than one roller 5 allowed rolling through the circulating circuits 45. The laterally opposed bulges 50 of the slider 2 is each provided therein the paired circulating circuits 45. With the linear motion guide unit constructed as stated earlier, the rollers 5 rolling through one of the paired circulating circuits 45 are allowed to transfer from the downside race 38, carrying downward load because of the slider 2, into the associated return passage 10 in the carriage 3 in a circulating manner. In contrast, the rollers 5 rolling through the other of the paired circulating circuits 45 are allowed to transfer from the upside race 38, carrying upward load because of the slider 2, into the associated return passage 10 in the carriage 3 in a circulating manner. Moreover, the guide rail 1 has some holes 17 that are used to fasten the guide rail 1 to any stationary bed including a machine bed, mounting base, and so on, while the carriage 3 of the slider 2 is made therein with some threaded holes 18 that are used to fasten the slider 2 to any component including a workpiece, a variety of instruments, and so on. On the bottom of the slider 2, there are provided lower seals 14.

Figure 9:
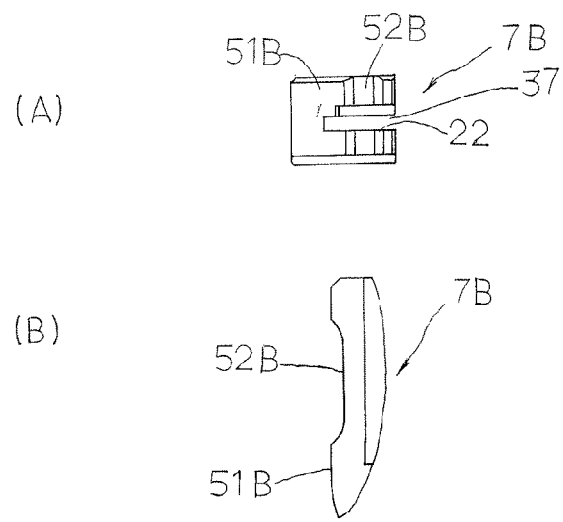
FIG. 9 is a view in different elevations showing a second spacer part to be nested in the first spacer part of FIG. 8.

The end cap 4 has sidewise opposing bulges 48 in each of which there are provided the turnaround passages 30 (30A, 30B) lying in crossed each other and also staggered relation in sliding direction of the slider, The end cap 4 is constituted with a pair of spacer parts 7 to define a circular surface of one of the turnaround passages 30, and an end cap major body 8 to define an outside curved surface of the other of the turnaround passages 30. The paired spacer parts 7 as shown in FIGS. 8 and 9 are made up of a major spacer part (first spacer part) 7A which fits into a recess 46 inside the end cap major body 8, and a minor spacer part (second spacer part) 72 which fits into a recess 36 inside the major spacer part 7A. Especially referring to FIG. 8, there is shown the major spacer part 7A which has a straight zone 51A on whose outward surface is formed a dent 52A that is made flat at the middle while arc or curved at opposite edges with respect to the traveling direction of the rollers to provide a lubricant sump. Next referring to FIG. 9, there is shown the minor spacer part 7B to be nested into the major spacer part 7A. The minor spacer part 7B has a straight zone 51B on whose outward surface is formed a dent 52B that is made flat at the middle while arc or curved at opposite edges with respect to the traveling direction of the rollers to provide a lubricant sump. The major or first spacer part 7A is designed to form an inside curved surface of the outer turnaround passage 30A defined by the recess 46 inside the end cap 4, and further form parts of an outside curved surface of the inner turnaround passage 30B. The minor or second spacer part 7B is designed to form an inside curved surface of the inner turnaround passage 30B defined by the recess 46 in the end cap 4, and further form parts of an outside curved surface of the inner turnaround passage 30B. The first and second spacers 7A and 7B are combined with each other into such arrangement that the turnaround passages 30A and 30B get intersected or crossed each other and staggered each other in traveling direction of the slider. The spacer parts 7A and 7B each have slots 22 to fit over applicator noses 26 of the porous compact 25 in a way the porous compact 25 are squeezed in part in the slots 22.

Now considering the inward end surface of the end cap 4 facing directly to the carriage 3 of the slider 2, the paired spacer parts 7 are placed in combination each other inside the recess 46 in the end cap major body 8 into such geometry that they get intersected each other to form the circular curved surface of the turnaround passage 30—the first spacer part 7A forms the outside curved surface half while the second part 7B forms the inside curved surface half. More especially, the first spacer part 7A forms both the inside curved surface of the outer turnaround passage 30A and some parts of the outside curved surface of the inner turnaround passage 30B, and the second spacer part 7B forms the inside curved surface of the inner turnaround passages 30B. To complete the turnaround passages 30 as stated earlier, the major spacer part 7A is first set in the recess 46 inside, for example the left bulge 48 of the end cap major body 8, then the minor spacer part 7B is nested in the major spacer part 7A in such geometry that the spacer parts 7A and 7B come into intersection with one another. With the left bulge 48 of the end cap major body 8, as a result, there are provided the inner turnaround passage 30B shorter or shallow in the end cap 4 and the outer turnaround passage 30A longer or deep in the end cap 4, and these turnaround passages 30A and 30B get intersected at right angles relative to each other and staggered from each other in lengthwise direction of the slider 2. After mating of the first spacer part 7A with the end cap major body 8 to create the outer turnaround passage 30A, the end cap major body 8 will define the outside curved surface of the outer turnaround passage 30A and the first spacer part 7A will define the inside curved surface of the outer turnaround passage 30A. Moreover, the inner turnaround passage 30B is finished with the outside curved surface half defined by combination of the end cap major body 8 with the first spacer part 7A, and the inside curved surface half created by the second spacer part 7B.

The circulating circuits 45 are each composed of the load-carrying race 38, the return passage 10, the longer outer one 30A of the turnaround passages 30 defined with the end cap major body 8 and the first spacer part 7A, and the shorter inner one 30B of the turnaround passages 30 defined with the end cap major body 8, the first spacer part 7A and the second spacer part 7B. The geometry of intersection between the inner and outer turnaround passages 30A and 30B alternates with each other in the widthwise direction of the end cap 4 perpendicular to the traveling direction of the slider 2. With the paired turnaround passages 30 lying in the right bulge 48 of the end cap 4, the outer turnaround passage 30A connects the downside load-carrying race 38 with the upside return passage 10 and the inner turnaround passage 30B connects the upside load-carrying race 38 with the downside return passage 10. In contrast, with the paired turnaround passages 30 lying in the left bulge 48 of the end cap 4, the outer turnaround passage 30A connects the upside load-carrying race 38 with the downside return passage 10 and the inner turnaround passage 30B connects the downside load-carrying race 38 with the upside return passage 10.

The end cap major body 8 is provided with spigots 33 to come into connection with the return passages 10. The spigots 33 are made integral with the outside curved surfaces of the turnaround passages 30 to conjoin with the spacer parts 7, thereby communicating with the return passages 10 to connect the turnaround passages 30 in the end cap 4 to their associated return passages 10 in the carriage 3 with smoothness. The end caps 4 at the middle area thereof have lubrication ports 29 into any one of which a grease nipple 43 fits to supply the slider 2 with lubricant. All lubrication ports 29 but one put to lubrication use are plugged with closures. Upon precise location and connection of the end cap 4 to the carriage 3, abutment of a sleeve 6 against the spigots 33 of the end cap 4 keeps accurate location of the end cap 4 to the sleeve 6, making sure of precise alignment of the spigots 33 of the end cap 4 with the return passages 10 in the carriage 3. Thus, end-to-end abutment between the sleeve 6 and the spigot 33 of the end cap 4 comes into flush connection of the return passage 10 with the turnaround passage 30 to finish the circulating circuits 45 of rectangle in transverse section with causing no discontinuity or gap at the connection between them. Coplanar continuity with no gap between the turnaround passages 30 in the end caps 4 and the return passages 10 defined by the sleeves 6 inside fore-and-aft bores 9 in the carriage 3 helps the rollers 5 transfer smoothly from the turnaround passages 30 to their associated return passages 10 and also from the return passages 10 to the turnaround passages 30 in a circulating manner.

With the miniaturized linear motion guide unit in which the rollers 5 are chosen as the rolling elements, a retainer plate 13 is installed to keep in place the rollers 5 during their rolling throughout the load-carrying races 38 and further keep the rollers 5 against falling away from the slider 2 after the slider 2 has taken away from the guide rail 1. The retainer plate 13 is fastened to the carriage 3 to define the load-carrying races 38 on the carriage 3 by means of a binding strip 23 which is fastened to the slider 2 after opposite bent ends thereof come into fit into notches 34 cut in the end cap 4.

The constructional feature of the linear motion guide unit of the present invention will be recited in detail by reference to, especially, FIGS. 1 to 10. With the linear motion guide unit constructed according to the present invention, especially, the porous or cellular compact 25 impregnated with lubricant to lubricate the rollers 5 rolling through the turnaround passages 30 is installed in the concavity 31 concaved in the inward end surface 47 of the end cap 4 in the slider 2, the inward end surface 47 facing directly to the carriage 3. The concavity 31 sinks below the inward end surface 47 to be surrounded with an exterior frame 24 and an interior wall 24A. The concavity 31 gets concaved to spread widthwise across the left and right bulges of the end cap and therefore the porous compact fits in the concavity 31 in a way lying across left and right bulges of the end cap. With the embodiment shown, as the end cap 4 in itself is small in size, the concavity 31 is made to extend widthwise of the end cap 4 in perpendicular to the sliding direction of the linear motion guide unit. The concavity 31 has deep pits 40 extending in the sliding direction of the slider 2 on opposite sides of the lubrication port 29 in the end cap major body 8, a flat or shallow basin 49 spreading out from the deep pits 40 towards the end surface 47, and channels 28 starting from the basin 49 to reach the slots 22 cut in the spacer parts 7, the channel 28 further communicating with the recesses 46 into which the spacer parts 7 is fitted. Terminals 37 open to the turnaround passages 30 are made in the spacer parts 7 which fit in the recesses 46 inside the end cap major body 8. The open terminals 37 are rectangular in cross section to fit snugly over the applicator noses 26 of the porous compact 25 in such fashion that tips 39 of the applicator noses 26 exposes themselves to the turnaround passages 30. On the bottoms of the slots 22 in the spacer parts 7, moreover, there are provided oiling holes 54 which communicate with the open terminals 37 in adjacency of the tips 39 of the applicator noses 26. Then, after the forward and aft end caps 4 are fastened to the opposite end surfaces 35 of the carriage 3, the lubricant is applied around the rollers 5 at the outer turnaround passages 30A and/or the inner turnaround passages 30B in respective paired circulating circuits 45.

Figure 10:
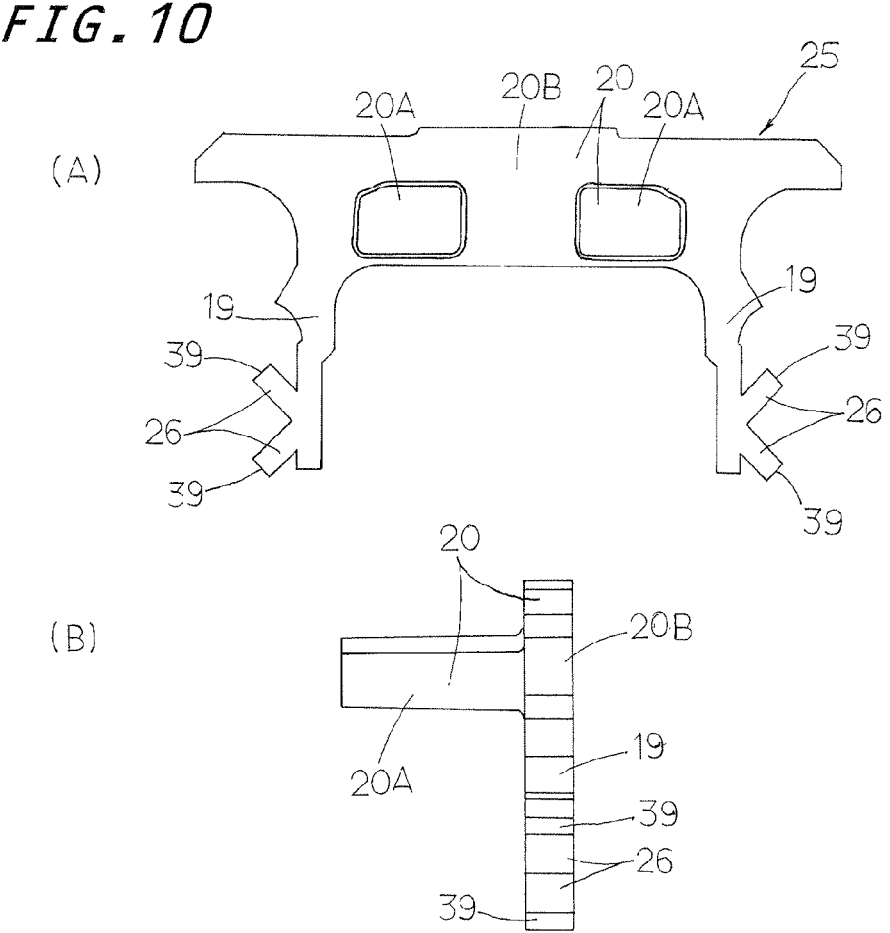
FIG. 10 is a view in different elevations showing a preferred version of a porous compact.
Figure 13:
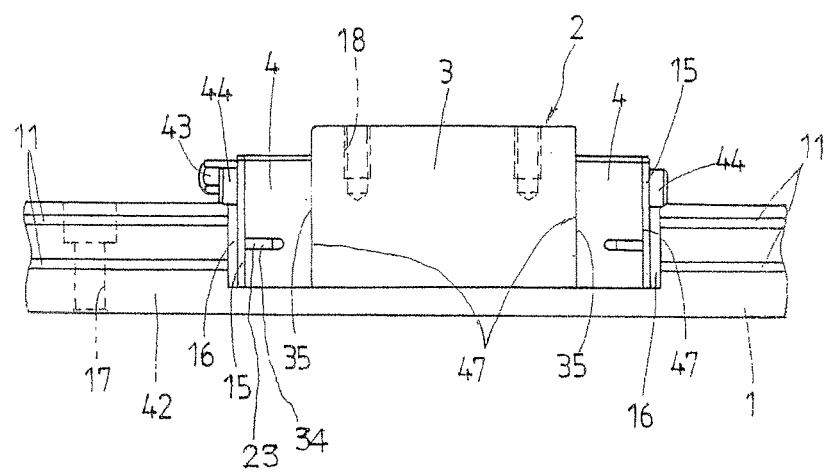
FIG. 13 is a view in overall side elevation showing a preferred embodiment of a linear motion guide unit according to the present invention.
Figure 14:
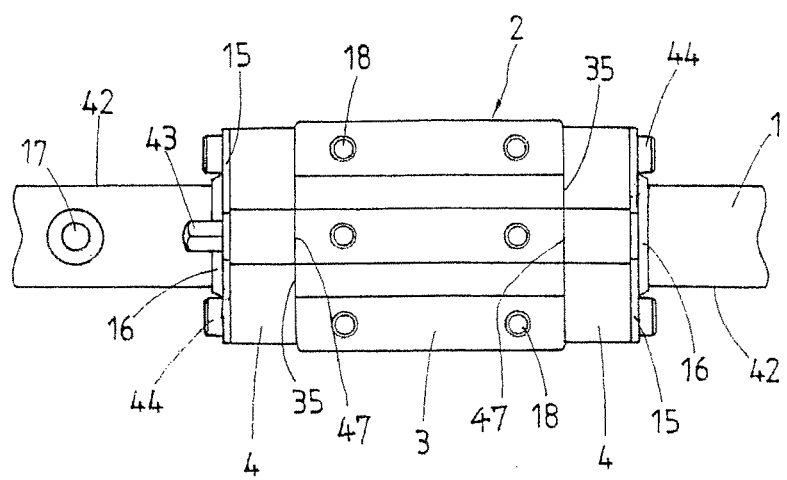
FIG. 14 is a view in plan of the linear motion guide unit of FIG. 13.
Figure 15:
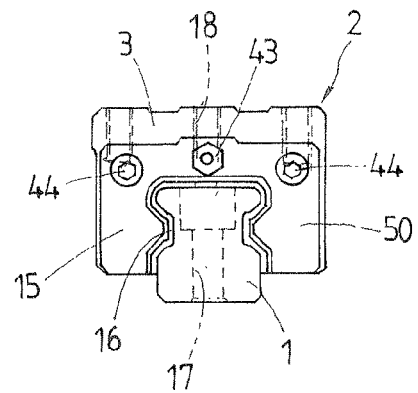
FIG. 15 is a view in front elevation of the linear motion guide unit of FIG. 13.
Figure 16:
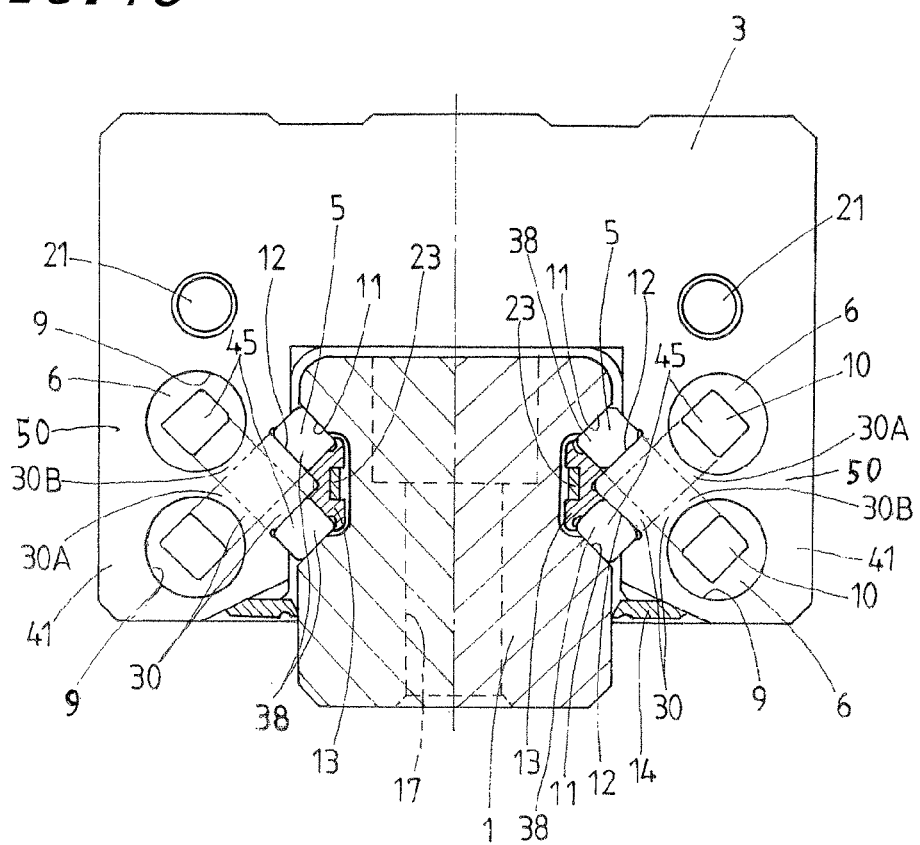
FIG. 16 is a view in transverse section of the linear motion guide unit of FIG. 13, but in which the end seal is removed from the slider.

The porous compact 25, especially as shown in FIG. 10, has the overall configuration suited to fit snugly into the concavity 31. The porous compact 25 has a major reservoir 20 capable of keeping plenty of lubricant in, the major reservoir 20 being made up of a first reservoir portions 20A extending in the sliding direction into the deep pits 40 of the concavity 31 and a second reservoir portion 20B conforming to the flat basin 49 in communication with the deep pits 40, a pair of slim downward extensions 19 designed to fit into the channels 28, and applicator noses 26 formed integral with the extensions 19 to fit into the slots 22 in the spacer parts 7 to lead the lubricant out of the open terminals 37 to wet the turnaround passages 30 with the lubricant. The applicator noses 26 on the extension 19 get forked off each other to reach the upside and downside turnaround passages 30, one to each turnaround passages 30, in a disposition that their tips 39 are exposed to the rollers 5. The exposed tips 39 of the applicator noses 26 are each raised slightly above the depressions 52A lying around the slots 22 in the spacer parts 7. The rollers 5, as coming into rolling contact with the exposed tips 39, are applied with lubricant. The exposed tip 39 in the spacer parts 7 is placed in exactly flush with the straight zone 51A on the spacer part 7 so as to cause no difference in level between them, and therefore the rollers are allowed circulating smoothly through the turnaround passages 30 without getting clogged at the exposed tip 39. The major reservoir 20 of the porous compact 25 is situated to fit into both the flat basin 49 and the deep pits 40, which are formed in an upper area 27 out of the turnaround passages 30 in the sidewise bulges 48 of the end caps 4. Moreover, the major reservoir 20 is designed to snugly conform to the concavity 31 to have the volume as large as possible. In the upper area 27 in the end cap 4, there is provided the lubrication port 29 lying at the midway between widthwise sides in facing on the carriage 3. In addition to the lubrication port 29, the exterior frame 24 and the interior wall 24A surrounding the upper area 27 help ensure sufficient stiffness or rigidity and mechanical strength, and therefore it is permitted to scoop the inward end surface 47, leaving the exterior frame 24 and the interior wall 24A, as much as desired to make the basin 49 and the pits 40 which are as deep and large in volume as possible. With the major reservoir 20, especially, the flat basin 49 and the pits 40 extending deep in the sliding direction along the lubrication port 29 are both made around the lubrication port 29 at the middle of the end cap 4 and the turnaround passages 30 so as to make sure of the volume as large as possible.

The major reservoir 20 of the porous compact 25 has the configuration better to make the most of the deep pit 40 and the flat basin 49 of the concavity 31 in volume to make the overall volume as large as possible to be impregnated with the most amount of lubricant. With the porous compact 25 fitted into the right concavity 31 in the end cap 4, the applicator noses 26 branch off and get farther away from each other as they head toward their tips 39 exposed to come into contact with the rollers 5. With the porous compact 25 fitted into the left concavity 31 in the end cap 4, in contrast, of the tips 39 of the applicator noses 26, only the downside tip 39 is exposed to come into contact with the rollers 5. Accordingly, though the linear motion guide unit gets miniaturized, a plenty amount of lubricant may be kept in the porous compact 25 especially at the major reservoir 20 and the maintenance-free condition for lubrication over a prolonged period is materialized just by insertion of porous compact 25 into the concavity 31.

According to the present invention, the porous compact 25 isn't installed on the outward end surface 47 of the end cap 4 facing directly to the end seal 15 and having the notches 34 thereon to fit over the bent ends of the binding strip 23, but on the inward end surface 47 facing to the carriage 3 opposite of the outward end surface 47. Upon assemblage of the slider 2, the porous compact 25 is fitted in the concavity 31 inside the end cap 4 preparatory to installation of the end cap 4 onto the end surface 35 of the carriage 3. Then, only fastening the end cap 4 onto the end surface 35 of the carriage 3 is sufficient to combine the end cap 4 with the carriage 3 with the porous compact 25 being fitted into the concavity 31 inside the end cap 4.

The porous compact 25 is made of finely powdery ultra-high molecular weight synthetic resin, which is first subjected to compacting and then sintering at elevated temperature. The sintered resinous compact product has open-porous or open-cellular texture whose pores or cells preserved among fine particles are open each other through interstices or channels. Lubricant is well absorbed and preserved in the pores or cells in the porous compact 25. The lubricant, as being better kept or preserved in the porous compact 25, is protected from spontaneously oozing out only by fitting the porous compact 25 into the concavity 31. The porous compact 25 from a fine powder of synthetic resin of polyethylene or polypropylene, because of better in generally preserving the accurate dimensions, can snugly fit or conform to certain concavities sophisticated in contour and continue applying steadily the lubricant around the rollers 5 without causing clog pores or cells at the tips which would come into engagement with the rollers 5. The exposed tip 39 of the applicator nose 26 in the porous compact 25 is oriented along the traveling direction of the rollers 5 in the turnaround passage 30. Moreover, the exposed tip 39 of the applicator nose 26 in the porous compact 25 has a length ranging for example from 1.0 to 1.5 times the diameter of the rollers 5, and the width ranging for example from 30 to 50% of the axial distance of the roller 5. The orientation and dimensions as recited earlier of the exposed tip 39 of the applicator nose 26 serve well to afford the rollers 5 more time to make rolling contact with the exposed tip 39, helping continue applying steadily the lubricant around the rollers 5.

Referring to FIG. 12, there is shown how the rollers 5 make rolling contact with the applicator nose 26 of the porous compact 25 at joining boundary between the turnaround passage 30 and a sleeve 6 defining the return passage 10. The rollers 5 roll with wobbling through the turnaround passage 30 and in doing so come into touch on the applicator nose 26 of the porous compact 25 lying on the inside curved surface of the turnaround passage 30. As a result, the rollers 5 are applied with the lubricant oozing out of the exposed surface of the applicator nose 26. For example, the roller 5 has a diameter of 1.6 mm and an axial length of 2.1 mm. Correspondingly, the exposed tip 39 of the applicator nose 26 in the porous compact 25 has a length of 1.9 mm equivalent to 1.2 times the diameter of the rollers 5, and an exposing width of 0.8 mm which parallels about 40% of the axial distance of the roller 5.

The return passage 10 in the carriage 3 is constituted with a lengthwise through-hole defined inside a sleeve 6 that fits into a fore-and-aft bore 9 made in the carriage 3 of the slider 2. The sleeve 6 is made of a synthetic resin. The sleeve 6, although fitted loosely in the fore-and-aft bore 9 in the carriage 3, is held in accurate place by the spigots 33 raised above the end caps 4, which are fastened to the forward and aft end surfaces 35 of the carriage 3. In the concavity 31 inside the end cap major body 8 of the end cap 4, as shown in FIG. 7, there are provided a central lubrication port 29 to be coupled on to the grease nipple 43 in the end cap 4, and arched oiling paths 32 extended from the lubrication port 29 into the sidewise opposite bulges 48, the oiling paths 32 coming into narrower oil grooves 32 which reach the turnaround passages 30. After the porous compact 25 has fitted into the concavity 31 inside the end cap major body 8, the oil grooves 32 form lubricant feeding lines to apply the lubricant to the circulating circuits 45 through the oiling hole 54 in the spacer part 7. Since the porous compact 25 has the major reservoir 20 preserving therein a plenty of lubricant enough for sustainable lubrication over the prolonged service period, in some circumstances, there would be no need of the lubrication port 29 and the oiling paths 32 for the deliberate replenishment of lubricant. Moreover, the porous compact 25, as dipped in part in the lubricant flowing through the oiling paths 32, is resupplied with the oily ingredient of the lubricant in the oiling paths 32 to help ensure further extension of maintenance-free service life possible.

Referring to FIG. 11, there is shown another version of the porous compact 25 to be fitted into the concavity 31 in the end cap 4. With the porous compact 25 of this another version, any one of the applicator noses 26 to fit into the first spacer part 7A is shorter than others so as to fall short of the open terminal 37 in the first spacer part 7A. In the version shown in FIG. 11, especially, the applicator nose 26 confronted with the downside load-carrying race 38 is made short in length, and in doing so away by a gap 53 from the rollers 5 rolling through the turnaround passage 30. Thus, the applicator nose 26 shorter in length has no exposed tip 39 which has to touch the rollers 5. As an alternative, it will be appreciated that another applicator nose 26 confronted with the upside load-carrying race 38 can be made shorter as opposed to the version recited earlier. Whenever an oozing rate of the lubricant out of the porous compact 25 comes too fast depending on the working condition of the linear motion guide unit and therefore the rest of lubricant runs low, the applied amount of the lubricant may be adjusted with reduction of the number of the tips which are in touch with the rollers 5. With the construction in which the tip of the applicator nose 26 is retracted to make the gap 53, it will be preferred not to make the slot 22 on the straight zone of the spacer part 7 to fill in the gap 53 for fear that the rollers 5 might be caught in the gap 53. On another end surface 35 of the carriage 3, there is provided the porous compact 25 having the applicator noses 26 of the same shape in the turnaround passage 30. Focusing in on the circulating circuit 45 as a whole, the rollers 5 may be applied with the lubricant through the applicator nose 26 exposed at any one of the open terminals 37 of the spacer parts 7.

With the linear motion guide unit constructed as stated earlier, the lubrication of the rollers 5 can be accomplished easily and simply with only the installation of the porous compact 25 impregnated with lubricant in the concavity 31 below the inward end surface 47 of the end cap 4, which faces directly towards the carriage 3. Substantial goal of the lubrication around the rollers 5 is to feed the load-carrying race 38 with lubricant. To this end, the rollers 5 coated with the lubricant in the turnaround passage 30 transfer into the load-carrying race 38 and in doing so the load-carrying race 38 is fed with the lubricant.

What is claimed is:

1. A linear motion guide unit, comprising:
   an elongated guide rail having two sides, each side having a pair of first raceway surfaces extending lengthwise of the guide rail, and
   a slider that fits over or conforms to the elongated rail for movement in a sliding manner relative to the elongated guide rail;
   wherein the slider has a carriage, end caps, end seals, and a plurality of rolling elements,
   the carriage having a pair of second raceway surfaces extending in opposition to the pair of first raceway surfaces on the guide rail to provide a pair of load-carrying races between the pair of first raceway surfaces and the pair of second raceway surfaces, and
   a pair of return passages extending along the pair of load-carrying races,
   the end caps being fastened on forward and aft end surfaces of the carriage, one to each end surface, and provided therein with turnaround passages to join together the pair of load-carrying races and the pair of return passages,
   the end seals being attached on outward end surfaces of the end caps, and
   rollers selected as the rolling elements which are allowed to roll through circulating circuits made up of the pair of load-carrying races, the pair of return passages and the turnaround passages;
   wherein each of the end caps has an inward end surface facing directly towards the end surface of the carriage, and having a concavity which extends into the inward end surface and a pair of openings communicating with each of the turnaround passages, and
   a porous compact impregnated with lubricant and fitted into the concavity in a fashion exposed in part to the turnaround passages through the openings so that the rolling element rolling through the turnaround passages, as coming into rolling-contact with at least one of the parts of the porous compact exposed out of the openings, are applied with the lubricant; and
   wherein the end cap has a pair of spacer parts to form inside curved surfaces of the turnaround passages, and an end cap major body to form outside curved surfaces of the turnaround passages,
   the pair of spacer parts being made up of first spacer parts fitted into the end cap major body and second spacer parts nested in the first spacer parts,
   the first spacer parts and the second spacer parts being in combination with each other to provide curved zones to change running direction of the rolling elements and straight zones integral with opposite ends of the curved zones and merged into the pair of return passages, and
   the straight zones having slots at ends each of which fits over a part of the porous compact, and the slots terminating in the openings through which the porous compact is exposed at the straight zones to the inside curved surfaces of the turnaround passages.

2. A linear motion guide unit constructed as defined in claim 1,
   wherein the concavity inside the end cap major body has a basin spreading over an upper area of the end cap major body, a pair of deep pits merging with the basin and extending in the sliding direction, a pair of channels starting from the basin to reach the slots cut in the spacer parts, a lubrication port lying in the upper area of the end cap major body, and oiling paths extending along a bottom over the basin and the channels and to reaching the lubrication port.

3. A linear motion guide unit constructed as defined in claim 2,
   wherein the porous compact has first reservoir portions extending in the sliding direction into the deep pits of the concavity to reserve the lubricant therein, a second reservoir portion conforming to the flat basin to reserve the lubricant therein, a pair of slim downward extensions to fit into the channels, and paired pair of applicator noses formed integral with the extensions to fit into the slots in the paired pair of spacer parts to lead the lubricant out of the openings in the spacer parts, applying the lubricant around the rolling elements.

4. A linear motion guide unit constructed as defined in claim 3,
   wherein the rolling elements, while rolling through the turnaround passages, come into rolling-contact with tips of the pair of applicator noses of the porous compact exposed to the turnaround passages to be coated with the lubricant.

5. A linear motion guide unit constructed as defined in claim 4,
   wherein the tips of the pair of applicator noses in the porous compact has a length ranging from 1.0 to 1.5 times a diameter of the roller, and a width ranging from 30 to 50% of an axial distance of the roller.

6. A linear motion guide unit constructed as defined in claim 2,
   wherein the porous compact after having fitted into the concavity in the end cap major body forms a route to make up for scarcity of lubricant.

7. A linear motion guide unit constructed as defined in claim 1,
   wherein the first and second spacer parts have dents on outside surfaces of the straight zones, each the dents being defined with a flat middle and curved opposite edges with respect to the traveling direction of the rollers to provide a lubricant sump.

8. A linear motion guide unit constructed as defined in claim 1, wherein the porous compact is made of a sintered resinous member of synthetic resin of any one of polyethylene and polypropylene which is compacted under pressure together with the application of heat, the resulting sintered resinous member having open-porous texture in which pores are open to each other through interstices among resinous particles inside the sintered member, and wherein the lubricant fills in the pores.

9. A linear motion guide unit constructed as defined in claim 1,
wherein the end cap major body has an outward end surface facing directly to an end seal, the outward end surface having notches thereon to fit over bent ends of a binding strip which fastens a retainer plate to the slider, the retainer plate being installed to keep in place the rollers during their rolling throughout the load-carrying races and further keep the rollers against falling away from the slider after the slider has taken away from the guide rail.

* * * * *